United States Patent Office 2,943,926
Patented July 5, 1960

2,943,926
ABRASIVE WHEEL COMPOSITION

George J. Goepfert, Cincinnati, Ohio, assignor to The Cincinnati Milling Machine Company, Cincinnati, Ohio, a corporation of Ohio No Drawing. Filed July 18, 1958, Ser. No. 749,328

11 Claims. (Cl. 51—298)

This invention relates to the manufacture of resin-bonded abrasive products, and more particularly to a novel type of resin-coated abrasive grain adapted to be used in producing resin-bonded grinding wheels having a relatively high ratio of bond to abrasive. Also the invention relates to a method of making such coated abrasive grain.

Resin-bonded abrasive products such as grinding wheels are commonly made by coating abrasive grain with the bonding resin in powder form and then molding the resin-coated abrasive grain into a grinding wheel having the desired configuration. In order to secure the desired adhesion of the powdered resin to the surface of the abrasive grain, the grain is first wetted with a suitable liquid adhesive which may be, for example, an organic solvent having at least some solvent power for the bonding resin, or a liquid form of the bonding resin. The wetted grain is then mixed with the bonding resin in dry powder form to produce a coating of resin on the abrasive grain, and the coated granules are molded under pressure, with or without the application of heat, to form a grinding wheel or other abrasive article. After molding, the wheel or other abrasive article is usually cured at an elevated temperature for a period of time sufficient to complete polymerization of the resin bond.

This conventional procedure can be used to produce resin-bonded grinding wheels that are satisfactory for some purposes. However, there are other applications for which wheels made by this conventional procedure are unsatisfactory. For example, abrasive wheels used for grinding alloy steel billets, slabs and sheet prior to rolling and finishing, which wheels are commonly called snagging wheels, must have a low porosity, open structure, that is to say, they must have a relatively high ratio of resin to abrasive and a low volatile content. A generally similar type of structure is required for certain other grinding wheels, such as, for example, reinforced cut-off wheels.

Such "high bond" wheels cannot be made satisfactorily by the conventional procedure outlined above. In order to achieve the high resin content required in such wheels, the coated abrasive grains used in forming the wheel must have a coating which comprises approximately 35%–80% by volume of the coated granules. When the conventional coating procedure is used, a relatively large amount of liquid adhesive must be applied to the abrasive grain to cause the required large amount of resin powder to adhere to the surface of the grain.

The use of such a large amount of liquid adhesive causes subsequent processing difficulties, and an inferior product is produced. Thus, if the coated abrasive grain is cold molded, the large quantity of liquid resin or solvent in the coated grain impairs the physical properties of the finished wheel. It is usually not possible to remove the liquid adhesive from the coated grain at a temperature below the curing temperature of the resin used. Hence even if the coated grain is hot pressed to form a wheel, liquid adhesive remains in the wheel structure and impairs its physical properties. Also to the extent that the liquid adhesive is vaporized during the heat-curing of the wheel, pores are formed in the wheel and the desired dense system is not achieved.

Various modifications of the conventional procedure have been proposed to overcome such problems. Thus it has been suggested that the abrasive grain be wetted with aqueous solutions of soluble resins or alkaline solutions of various adhesive materials. However, such proposals yield relatively sticky mixtures which tend to "ball up" so that thorough mixing of the ingredients is difficult, and a free flowing body of granules wherein each granule contains only one abrasive grain cannot be achieved. It has also been proposed in, for example, Robie Patent 2,171,635 that the abrasive grain be wetted with water alone and then mixed with the dry powdered resin to form a coating. However, as pointed out in the Robie patent, water, since it is not a solvent for the resin, does not cause the resin to adhere tenaciously to the grain. Hence the coated grain obtained by the use of water alone is relatively friable, and stable coatings having the desired relatively thick layer of resin cannot be attained in this way.

It is accordingly, an object of the present invention to provide a method of making resin-coated abrasive grain adapted to be used in the molding of high bond, low porosity abrasive products having improved physical properties. It is also another object of the invention to provide a method of making resin-coated abrasive grain, the granules of which are of relatively uniform size and free-flowing, and have a relatively thick coating of resin thereon, i.e. a coating that comprises from 35%–80% of the volume of the coated granules. It is a further object of the present invention to provide resin-coated abrasive grain having a relatively hard, strongly adherent layer of resin on the abrasive grain which permits storage of the coated grains for substantial periods of time without deterioration. Other objects of the invention will be in part obvious and in part pointed out hereafter.

The objects of the invention are achieved in general by carrying out the application of powdered resin to the abrasive grain in a certain sequence of steps wherein distinct portions of the resin powder, or a mixture of resin powder with a suitable filler, are applied to the surfaces of the abrasive grain with the air of different types of adhesion-promoting agents. More particularly the abrasive grain is first wetted with a relatively small quantity of a liquid adhesion-promoting agent which is an organic material having a solvent power for the solid coating resin. The adhesion-promoting agent initially used may be, for example, a liquid form of the solid coating resin, or an organic solvent having a solvent power for the resin, or a mixture of the liquid resin and solvent.

Only a relatively small amount of this first adhesion-promoting agent is used to initially wet the grain surfaces. The amount of the first adhesion-promoting agent used is preferably 0.25% to 2.0% by weight of the abrasive grain, although up to 4.0% may be used if desired. Thereafter the wetted grain is mixed with a dry powdered resin composition to cause the grain to be coated with the resin composition. Since only a small quantity of the first adhesion-promoting agent is used, the solid resin coating initially formed is relatively thin. The quantity of powdered resin composition initially mixed with the wetted grain can be only that amount which will be completely used in coating the grain, or an excess of the resin powder composition may be employed.

In the next step of the process, water is used as an adhesion-promoting agent. The relatively thinly coated abrasive grain is mixed with an amount of water equal to about 2% to 10% by weight of the abrasive grain. Thereafter a second portion of dry, powdered resin composition is added to and mixed with the abrasive grain to form a relatively thick resin coating on the grain. The amount of water used depends in part upon whether an excess of powdered resin was used in the first coating step of the process and in part upon the amount of material forming the second portion of resin powder that is incorporated in the mixture. In general the quantity of added water should be such as to cause the second portion of dry resin plus any excess resin powder from the first coating step to form a coating on the abrasive granules.

Upon completion of the second coating step, the added water is removed from the coated granules by vaporization, either by drying at room temperature, or by heating the granules in an oven to an elevated temperature, or by first drying at room temperature and then at an elevated temperature. If the coated granules are to be stored for an extended period of time it may be desirable to apply a dusting powder thereto, as described in detail hereafter.

It has been found that coated granules prepared by the process outlined above are of relatively uniform size and have a hard, relatively thick resin coating which makes them free flowing. Moreover, they can be stored for long periods of time and then molded to yield grinding wheels having the desired physical properties.

The abrasive grain used as a starting material in the present process may be of any of the known and conventional types. Thus the abrasive used may be alumina, silicon carbide, diamond, zirconia, garnet or emery. The particle size of the abrasive may vary over a relatively wide range, say 8 to 60 grit. It has been found that the present process is especially useful in the coating of relatively large abrasive particles, say in the range 8 to 16 grit, wherein prior processes require wetting with relatively large amounts of liquid adhesive to achieve a heavily coated grain.

The coating resin used in carrying out the present method may be any of those that have been previously used in the preparation of resin-bonded abrasives. Ordinarily condensation resins are used for this purpose, such resins including phenol-formaldehyde, melamine-formaldehyde, urea-formaldehyde, aniline-formaldehyde and epoxy resins, as well as phenolic resins blended with minor proportions of other resins such as vinyl and epoxy resins. The phenolic resins are the bonding agents most commonly used in the manufacture of resin-bonded wheels, and hence the present process will be illustratively described as utilizing such resins.

As pointed out above, the adhesion-promoting agent used in the first step of the present process may be a liquid form of the coating resin. Suitable liquid resins are commercially available and have previously been used in the preparation of coated abrasive grains. The adhesion-promoting agent used for initial wetting of the abrasive grain may also be an organic solvent, suitable solvents being furfural, cresylic acid, cresol, benzaldehyde, furfuryl alcohol, tetrahydrofurfuryl alcohol and the like. As indicated above, the amount of initial adhesion-promoting agent used is preferably 0.25% to 2.0%, although up to 4% based on the weight of the abrasive can be used.

The dry solid powdered resin used as a coating is preferably admixed with an inert powdered filler. A wide variety of such inert fillers are available and can be employed, including cryolite, calcium carbonate, iron pyrites, iron oxide, calcium sulfate, barium sulfate, and silica, as well as powdered organic synthetic resins such as cured phenolic resins, powdered thermoplastic resins and the like. Inorganic fibers such as glass and asbestos, and organic fibers such as cotton, nylon and the like may also be used. While the particle size of the filler is not particularly critical, 100–300 mesh powders have been found convenient.

As pointed out above, if the coated grain is to be stored for an extended period of time, it is desirable to apply a conventional dusting powder thereto. Conventional dusting powders such as silica gel, calcium silicate and magnesium silicate which are available in very finely divided form may be used in proportions of say 1%–2% by weight of the coated grain for this purpose.

In order to point out more fully the nature of the present invention the following specific examples are given of illustrative embodiments of the present method showing the way in which the coated abrasive grain can be prepared and molded into abrasive articles.

*Example 1*

A Lancaster-type mixer was charged with 1520 grams each of 12, 14 and 16 grit aluminum oxide abrasive. To the 4560 grams of abrasive grain 5.4 grams of a solution of 20% cresylic acid and 80% furfural were added with mixing. Thereafter 61.5 grams of a liquid phenol-formaldehyde resin having a low water compatibility (Snyder Chemical Corporation's Synco 770) was added, and mixing was continued to thoroughly distribute the solvent and liquid resin on the surfaces of the abrasive grain.

A dry resin composition was prepared by mixing 330 grams of a powdered two-stage phenol-formaldehyde resin containing 7–9% epoxy resin (Bakelite BRPC 8004) and 513 grams of naturally occurring cryolite filler (200-mesh). The resulting 843 grams of mixed resin and filler was added to the wetted abrasive grain in the mixer and thoroughly mixed therewith. A portion of the powdered resin composition coated the wetted grain and the remainder was dispersed throughout the mix as a loose powder. Then 293 grams of water was added to and thoroughly dispersed throughout the mixture.

A second portion of resin powder composition was prepared comprising 168.5 grams of powdered phenolic resin (BRPC 8004) and 172.5 grams of cryolite, and this second portion of resin powder was introduced into the mixer. The amount of added water was such as to cause the second portion of resin composition, as well as the excess loose powder from the first portion of solid resin composition, to form a coating on the abrasive grain. After all of the added resin powder had been coated on the abrasive grain, 40.5 grams of finely divided calcium silicate (Johns Manville's Micro-Cel E) was added to the mixture and dispersed therein.

The mixture as thus prepared was removed from the mixer, screened and spread out in a layer ½" thick on kraft paper to air dry. It was allowed to air dry at room temperature over night with occasional loosening to prevent cake formation. On completion of the overnight drying, the mix was passed through a coarse screen (8 mesh) to break up the loose aggregates of the coated granules and then spread in a ½" layer on kraft paper in an aluminum pan and given an oven heat treatment of 16 hours at 150° F. to remove final traces of water. It was found that the abrasive grain was uniformly coated with the solid resin bond, and that the resin bond was firmly adherent to the abrasive grain and relatively hard.

The coated abrasive grain was used to make a grinding wheel as follows: The coated grain was reintroduced into the mixer along with 8 grams of creosote oil, 18.6 grams of a liquid phenol-formaldehyde resin (Varcum 8142), 80.3 grams of powdered resin (Bakelite BRPC 8004) and 53.5 grams of anhydrous calcium oxide. After thorough mixing, 11,750 grams of this mixture were molded into a grinding wheel in a 12" x 2" x 2" mold. The mixture was preheated for one hour at 150° F. before being introduced into the mold, and molding of the wheel was effected at 3,000 p.s.i. and at a temperature of 290° F. After molding, the wheel was cured in an oven at an initial temperature of 185° F. The oven temperature was increased over a period of 30 hours up to 365° F. and then held at the latter temperature for an additional period of 16 hours.

The resulting wheel was found to give exceptionally good performance in terms of metal removal rate and wheel loss rate. More particularly, the wheel was tested on a standard swing-frame grinder at head pressures of 175 lbs. and 200 lbs. with the following results:

| Head Pressure | Metal Removal Rate in lbs. per Hour | Wheel Loss in lbs. per Hour | Efficiency—Metal Removal Divided by Wheel Loss |
| --- | --- | --- | --- |
| 175 lbs | 25.5 | 2.97 | 8.6 |
| 200 lbs | 33.3 | 4.2 | 7.9 |

*Example 2*

A resin-bonded cutting wheel was made utilizing the general procedure given in Example 1 but with the modifications indicated below:

The mixer was charged with 1960 grams of 24 grit alumina abrasive grain, and 60 grams of liquid phenolic resin (Synco 770) was added to the mixer to wet the abrasive grain. A dry resin composition was prepared by mixing 214.5 grams of a powdered two-stage hexamethylenetetramine-catalyzed phenolic resin containing 7–9% of polyvinyl butyral resin (Monsanto's Resinox No. 795), 3.75 grams of powdered resin-soluble black dye (National Aniline's Nubian Black), 7.5 grams of finely powdered graphite (200 mesh), and 168 grams of cryolite (200 mesh). The dry resin composition was mixed with the solvent-wetted abrasive grain as described in Example 1 and thereafter 255 grams of water was added. When the water had been thoroughly incorporated in the mixture a second portion of dry resin composition was incorporated therein comprising 304.5 grams of powdered resin (Bakelite BR 2417), 3.75 grams Nubian Black dye, 7.5 grams of graphite and 252 grams of cryolite. Thereafter 22.5 grams of calcium silicate dusting powder (Micro-Cel E) was added to the mixer.

The resulting mixture was spread on paper and air dried at room temperature. It was then molded into a 10" x 1/8" x 5/8" glass fiber reinforced, cut-off wheel at a pressure of 1000 p.s.i. and a temperature of 300° F. The molded wheel was cured in an oven at an initial temperature of 250° F. The oven temperature was raised to 325° F. over a period of eight hours and held at the latter temperature for sixteen hours.

The flexural strength of the resulting cured wheel was measured and found to be 9500 p.s.i. The wheel was tested in a standard cutting machine wherein it was used to cut 1/2" cold rolled steel bars. After making 45 cuts at the rate of 1.1 seconds per cut, the wheel showed wear equivalent to a decrease in diameter of 0.38 inch. Thus the wheel made by the procedure given in the present example exhibited exceptionally good performance in use.

*Example 3*

A cut-off wheel was made following the procedure of Example 2 except that no liquid resin was used to wet the abrasive grain and short fibered asbestos was used in place of cryolite as a filler. The quantities of ingredients used were as follows:

| | Grams |
| --- | --- |
| 24 grit Al$_2$O$_3$ | 2070 |
| Solution of 20% cresylic acid and 80% furfural | 40 |
| Powdered resin (Resinox 795) | 321 |
| Short-fibered asbestos | 122 |
| Water | 144 |
| Powdered resin (Bakelite 2417) | 325 |
| Short-fibered asbestos | 123.3 |

Wheels molded from this composition as in Example 2 exhibited improved performance.

*Example 4*

A mixer was charged with 1827 grams of 24 grit fused zirconia (ZrO$_2$). The abrasive grain was wetted with 48.4 grams of a solution comprising 10% by weight cresylic acid, 40% furfural and 50% liquid phenolic resin (Varcum 8121). The organic liquid coated grain was mixed with a solid resin composition comprising 161.7 grams of powdered phenolic resin (Resinox 795), 88 grams of cryolite and 5.5 grams of Nubian Black dye. The resulting mixture was wetted with 147 grams of water and thereafter a second portion of solid resin composition was incorporated in the mixture comprising 241 grams of solid resin (Bakelite BR 2417), 132 grams of cryolite and 5.5 grams of Nubian Black. 22 grams of calcium silicate dusting powder (Micro-Cel E) were added to the mixture. The coated grain was dried as in Example 1.

Wheels molded from resin-coated abrasive grain prepared in the manner described in this example showed exceptionally good wearing quality.

*Example 5*

The procedure of Example 4 was followed except that the 1827 grams of zirconium oxide was replaced by 1184 grams of 24 grit silicon carbide. Good coating of the abrasive grain with the resin bond was obtained and the coated grain was molded into a wheel having good uniformity and mechanical strength.

*Example 6*

3650 grams of 24-grit aluminum oxide abrasive was charged into a Lancaster type mixer and 25.5 grams of a solution of 20% cresylic acid and 80% furfural added to the abrasive with mixing. 36.5 grams of a liquid one-stage alkaline-catalyzed phenol-formaldehyde resin (Varcum No. 8121) was then added to the solvent wetted abrasive.

A resin powder composition was prepared by uniformly blending 432 grams of a two-stage hexamethylene tetramine-catalyzed phenol-formaldehyde resin (Bakelite BR 2417) and 432 grams of naturally occurring cryolite filler. This composition (864 grams) was added to and mixed with the wetted grain. A portion of this resin powder coated the wetted grain and the remainder was dispersed throughout the mix as a loose powder.

Tap water in the amount of 270 grams was then added while continuing the mixing. To the water wetted mixture 250 grams of a uniform blend of 125 grams of resin powder (BR 2417) and 125 grams of cryolite were added. The mixture was allowed to blend in the mixer for 1–2 minutes. It was removed from the mixer and spread in a 1/2" thick on kraft paper. It was allowed to air dry at room temperature over-night with occasional loosening to prevent cake formation. Upon completion of the over-night drying, the mix was passed through a coarse screen (8-mesh) to break up the loose aggregates of the coated granules. It was then spread in a 1/2" layer on kraft paper in an aluminum pan and given an oven heat treatment of 16 hours at 125° F. to remove the final traces of water.

The resin bond was uniformly coated on the abrasive grain. The mix was molded at 300° F. and 3,000 p.s.i. into a bonded abrasive disc 4" in diameter by 2" thick. A polished section through this disc when examined microscopically showed excellent uniformity in respect to distribution of abrasive particles through the resin bond matrix and the bond was completely free from flaws.

*Example 7*

A mix identical to that of Example 6 was prepared save that 50 grams of a finely divided silica dusting powder (Monsanto's Santocel) was added to the mix as the final ingredient. This finely divided material coated each resin-coated abrasive particle and prevented both wetting of the kraft paper after the mix had been spread on it and caking of the mix during the air drying. The mix was also given an oven dry of 16 hours at 125° F. to remove the final traces of water. Molding of this mix into a bonded abrasive product at 300° F. and 3,000 p.s.i. gave a well bonded, high quality article.

Example 8

A mixer was charged with 2070 grams of 24-grit aluminum oxide, and 81 grams of a liquid one-stage phenolformaldehyde resin (Varcum 8121) was added. Thereafter a uniform blend of 306 grams of an epoxy modified two-stage hexamethylene tetramine-catalyzed phenol-formaldehyde resin (Varcum 1930) and 102 parts of cryolite was added. 144 parts of tap water was then added to this mixture. To the water-wetted mix a uniform blend of 310 parts of resin powder (Varcum 1930) and 104 parts of cryolite was added. 30 grams of Santocel was added as a final ingredient.

The mix was screened through an 8-mesh screen and spread in a layer 3/4" to 1" on kraft paper for air drying. The abrasive particles were uniformly coated with the bond and the mix resembled loose uncoated abrasive in its ability to be poured or charged into a mold for fabrication into bonded abrasive articles.

Example 9

A mixer was charged with 2049 grams of 24-grit aluminum oxide abrasive and 69 grams of a solution comprising 10% cresylic acid, 40% furfural and 50% of a liquid one-stage phenol-aldehyde resin (Varcum No. 8121). A uniform blend of 238 grams of a powdered two-stage hexamethylene tetramine-catalyzed phenolic resin containing 7-9% of polyvinyl butyral resin (Monsanto's Resinox No. 795), 169 grams of lead chloride and 7.5 grams of a powdered resin-soluble black dye (Nubian Black) was added. 175 grams of water was then added.

To the water-wet mix a uniform blend of 356 grams of powdered two-stage hexamethylene tetramine-catalyzed phenol-aldehyde resin (Bakelite BR 2417), 254 grams of lead chloride and 7.5 grams of powered black dye (Nubian Black) was added. 15 grams of a finely divided calcium silicate (Micro-Cel E) was added as the final ingredient. The mix was spread out in a layer 3/4" to 1" thick on kraft paper and allowed to air dry. It was then placed in an oven at 125° F. and heated for 16 hours to remove the last traces of moisture.

The resulting coated grain was of uniform high quality and had virtually all of the bond coated about the abrasive particles. It was fabricated into a glass cloth reinforced cut-off wheel and gave cutting characteristics substantially better than obtainable from similar products available from commercial sources.

Example 10

1464 grams of 24-grit aluminum oxide abrasive was charged into a mixer. To this, 57 grams of a solution consisting of 10% cresylic acid, 40% furfural and 50% of a liquid one-stage phenol-formaldehyde resin (Varcum 8121) was added. A blend of 221 grams of powered two-stage phenolic resin containing 7-9% polyvinyl butyral resin (Monsanto's Resinox 795), 45 grams of a powdered chlorinated thermoplastic resin (Hercules Powder Company's Penton No. 115 molding powder), 60.1 grams of cryolite and 11 grams of powdered graphite was added to the wetted grain. Then 145 grams of tap water was added to the mixture.

To the water-wetted mixture a blend of 221 grams of powdered two-stage phenolic resin (Bakelite BR 2417), 60 grams of cryolite and 4.4 grams of resin-soluble Nubian Black dye was added. 22 grams of finely divided calcium silicate (Micro-Cel E) was added as the final ingredient. The mix was then spread on kraft paper in a layer 1/2" to 1" thick for air drying. Thereafter it was given an oven dry for 16 hours at 120° F. after which it was molded into cut-off wheels at 300° F. and 1500 p.s.i. pressure. Wheels of excellent appearance and quality resulted.

Example 11

1405 grams of 60-grit aluminum oxide abrasive was charged into a mixer. To this 48.4 grams of a solution of 10% cresylic acid, 40% furfural and 50% liquid one-stage phenol-formaldehyde resin (Varcum 8121) was added. A blend of 161 grams of powdered two-stage hexamethylene tetramine-catalyzed phenolic resin containing 7-9% polyvinyl butyral resin (Resinox 795), 88 grams of cryolite and 5.5 grams Nubian Black resin-soluble black dye was added to the wetted grain. 145 grams of water was added.

A blend of 241 grams of powdered two-stage phenolic resin (BR 2417), 132 grams of cryolite and 5.5 grams of Nubian Black dye was then added to the mixture. 18 grams of calcium silicate (Micro-Cel E) was added as the last ingredient.

The mix was spread on kraft paper in a 3/4"-1" layer for air drying. Upon completion of the air dry, it was given an oven treatment of 16 hours at 120° F. The uniformly coated abrasive grains were molded into a cut-off wheel. The molded wheel exhibited flexural strength of 12,500 lbs. and an efficient cutting performance.

Example 12

The procedure of Example 1 was followed through the addition of the second portion of resin powder composition. The resulting coated granules were air dried on kraft paper for 16 hours at room temperature, and then heated for 16 hours at 145° F. to complete removal of the water therefrom.

To 1170 parts of this mix were added 17.6 parts of a solution consisting of 10% cresylic, 40% furfural and 50% liquid phenolic resin (Varcum 8121), and mixing continued for 3 minutes. This mixture was charged into a 6" wheel mold having a 7/8" arbor pin and molded at 3000 p.s.i. in a press having cold platens. The compacted wheel so obtained measured approximately 1" thick. It was then placed into a forced draft curing oven at an initial temperature of 185° F. The oven temperature was increased over a period of 30 hours up to 365° F. and then held at the latter temperature for an additional period of 16 hours. The resulting wheel was of homogeneous structure and well bonded.

It is of course to be understood that the foregoing examples are illustrative only, and that numerous changes can be made in the ingredients, proportions and conditions specifically set forth therein without departing from the spirit of the invention as set forth in the appended claims.

I claim:

1. The method of making abrasive granules coated with a filled condensation resin and adapted to be molded to form a resin-bonded grinding wheel having a relatively high ratio of bond to abrasive and a relatively low volatile content which comprises, wetting the surfaces of the granules of an abrasive material with a bond-adhesion-promoting agent selected from the group consisting of said condensation resin in liquid form, an organic solvent having an appreciable solvent power for said condensation resin and a mixture of said liquid resin and solvent, mixing with the wetted granules a first portion of said filled condensation resin in dry powder form to cause said granules to be coated with dry resin, adding water to the resulting mixture to wet the coated granules and any excess of resin powder that may be present in the mixture, incorporating a second portion of said dry powdered resin in the water-wet mixture to increase the thickness of the resin coating on said granules, the quantity of said added water being sufficient to cause said second portion of powdered resin to adhere to said coated granules, and vaporizing the added water from said coated granules.

2. The method of making a resin-bonded abrasive product having a relatively high ratio of bond to abrasive and a relatively low volatile content which comprises, wetting the surfaces of granules of an abrasive material with a bond-adhesion-promoting agent selected from the group consisting of said condensation resin in liquid form, an organic solvent having an appreciable solvent power for said condensation resin and mixtures of said liquid resin and solvent, mixing with the wetted granules a first portion of said filled condensation resin in dry powder form to cause said granules to be coated with said dry resin, adding water to the resulting mixture to wet the coated granules and any excess of resin powder that may be present in the mixture, incorporating a second portion of said dry powdered resin in the resulting mixture to increase the thickness of the resin coating on said granules, the quantity of said added water being sufficient to cause said second portion of powdered resin to adhere to said coated granules, vaporizing the added water from said coated granules and molding said granules to form said resin-bonded abrasive product.

3. A method according to claim 2 and wherein said bond-adhesion-promoting agent is a liquid form of said condensation resin.

4. A method according to claim 2 and wherein said bond-adhesion-promoting agent is an organic solvent having an appreciable solvent power for said condensation resin.

5. A method according to claim 2 and wherein said bond-adhesion-promoting agent is a mixture of said liquid resin and solvent.

6. A method according to claim 2 and wherein said condensation resin is a phenolic resin.

7. A method of making abrasive granules coated with a filled condensation resin and adapted to be molded to form a resin-bonded grinding wheel having a relatively high ratio of bond to abrasive and a relatively low volatile content which comprises wetting the surfaces of granules of an abrasive material with a bond-adhesion-promoting agent selected from the group consisting of a liquid phenolic resin, an organic solvent having an appreciable solvent power for said phenolic resin and mixtures of said liquid resin and solvent, mixing with the wetted granules a first portion of a dry powder mixture of solid phenolic resin and filler to cause said granules to be coated with said dry resin mixture, wetting the coated granules with a quantity of water amounting to between 2% and 10% by weight of the weight of said abrasive granules, incorporating a second portion of said dry powder mixture of resin and filler in the resulting mixture to increase the thickness of the coating on said granules, and vaporizing the added water from the granules.

8. A method according to claim 7 and wherein the quantity of added dry resin and filler is such as to provide coated granules wherein the coating amounts to from 35%–80% of the volume of the granules.

9. A method according to claim 7 and wherein the coated granules are treated with a dusting powder to prevent caking during storage.

10. Coated abrasive granules made by the method of claim 1.

11. A resin-bonded grinding wheel having a relatively high ratio of bond to abrasive and a relatively low volatile content made by the method of claim 2.

References Cited in the file of this patent

UNITED STATES PATENTS

| | | |
|---|---|---|
| 1,901,325 | Novotny | Mar. 14, 1933 |
| 2,171,635 | Robie et al. | Sept. 5, 1939 |
| 2,559,665 | Ries et al. | July 10, 1951 |